US009763377B2

(12) United States Patent
Yokoyama (10) Patent No.: US 9,763,377 B2
(45) Date of Patent: Sep. 19, 2017

(54) RUNNING SYSTEM OF WORK VEHICLE (71) Applicant: YANMAR CO., LTD., Osaka-shi, Osaka (JP)

(72) Inventor: Kazuhisa Yokoyama, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/311,337

(22) PCT Filed: May 21, 2015

(86) PCT No.: PCT/JP2015/064576
§ 371 (c)(1),
(2) Date: Nov. 15, 2016

(87) PCT Pub. No.: WO2015/178446
PCT Pub. Date: Nov. 26, 2015

(65) Prior Publication Data
US 2017/0079195 A1 Mar. 23, 2017

(30) Foreign Application Priority Data

May 22, 2014 (JP) .................. 2014-106557
May 22, 2014 (JP) .................. 2014-106559

(51) Int. Cl.
*B60W 10/06* (2006.01)
*A01B 69/04* (2006.01)
(Continued)

(52) U.S. Cl.
CPC ............ *A01B 69/008* (2013.01); *A01B 69/00* (2013.01); *B60W 10/06* (2013.01); *B60W 10/18* (2013.01);
(Continued)

(58) Field of Classification Search
CPC ........ A01B 69/008; A01B 69/00; G05D 1/02; G05D 1/0011; G05D 1/0088;
(Continued)

(56) References Cited

U.S. PATENT DOCUMENTS 6,148,255 A 11/2000 Van Der Lely
6,932,554 B2 * 8/2005 Isfort .................. A01D 43/087
193/16
(Continued)

FOREIGN PATENT DOCUMENTS

JP H05158537 6/1993
JP 06004129 A 1/1994
(Continued)

OTHER PUBLICATIONS

International Search Report corresponding to Application No. PCT/JP2015/064576; Date of Mailing: Aug. 11, 2015, with English translation.
(Continued)

*Primary Examiner* — Richard Camby
(74) *Attorney, Agent, or Firm* — Cantor Colburn LLP (57) ABSTRACT

A parallel operation work vehicle for enabling operation of an autonomous work vehicle by a long distance operating device installed in an accompanying work vehicle for performing work while accompanying the autonomous work vehicle, wherein the accompanying work vehicle is provided with a display and a speaker as notification means, the notification means is capable of communicating with the autonomous work vehicle through a communication device, and, when a distance to the edge of the cultivated field from the autonomous work vehicle approaches a set distance, a control device transmits a signal to a control device of the accompanying work vehicle through the communication device and issues a warning through the notification means.

9 Claims, 5 Drawing Sheets (51) Int. Cl.
*A01B 69/00* (2006.01)
*G05D 1/02* (2006.01)
*B60W 10/18* (2012.01)
*B60W 30/14* (2006.01)
*B60W 50/02* (2012.01)
*B60W 50/14* (2012.01)
*G05D 1/00* (2006.01)

(52) U.S. Cl.
CPC ...... *B60W 30/143* (2013.01); *B60W 50/0205* (2013.01); *B60W 50/14* (2013.01); *G05D 1/0011* (2013.01); *G05D 1/0088* (2013.01); *G05D 1/02* (2013.01); *G05D 1/0278* (2013.01); *G05D 1/0291* (2013.01); *B60W 2050/022* (2013.01); *B60W 2050/0215* (2013.01); *B60W 2050/143* (2013.01); *B60W 2050/146* (2013.01); *B60W 2420/42* (2013.01); *B60W 2550/10* (2013.01); *B60W 2720/10* (2013.01); *G05D 2201/0201* (2013.01)

(58) Field of Classification Search
CPC ............... G05D 1/0278; G05D 1/0291; G05D 2201/0201; B60W 10/06; B60W 10/18; B60W 30/143; B60W 50/0205; B60W 50/14; B60W 2050/0215; B60W 2050/022; B60W 2050/143; B60W 2050/146; B60W 2420/42; B60W 2550/10; B60W 2720/10

See application file for complete search history.

(56) References Cited

U.S. PATENT DOCUMENTS

| | | | |
|---|---|---|---|
| 8,170,785 | B2 | 5/2012 | Diekhans et al. |
| 8,755,976 | B2 | 6/2014 | Peters et al. |
| 9,265,187 | B2 * | 2/2016 | Cavender-Bares ...... A01C 7/00 |
| 2007/0233374 | A1 | 10/2007 | Diekhans et al. |
| 2011/0022273 | A1 | 1/2011 | Peters et al. |

FOREIGN PATENT DOCUMENTS

| | | |
|---|---|---|
| JP | H11212639 A | 8/1999 |
| JP | 2001507843 A | 6/2001 |
| JP | 2004337031 A | 12/2004 |
| JP | 2008224625 A | 9/2008 |
| JP | 2009232783 A | 10/2009 |
| JP | 2011517400 A | 6/2011 |

OTHER PUBLICATIONS

Notification of Reasons for Refusal for corresponding Japanese Application No. 2014-106557; dated Jul. 31, 2017.

* cited by examiner

RUNNING SYSTEM OF WORK VEHICLE

This is the U.S. national stage of application No. PCT/JP2015/064576, filed on May 21, 2015. Priority under 35 U.S.C. §119(a) and 35 U.S.C. §365(b) is claimed from Japanese Application No. 2014-106557, filed May 22, 2014, and Japanese Application No. 2014-106559, filed May 22, 2014 the disclosures of which are also incorporated herein by reference.

TECHNICAL FIELD

The present invention relates to a technique for surely performing accompanying traveling work in a traveling system of an autonomous traveling work vehicle that can autonomously travel along a set traveling route, utilizing a satellite positioning system, and a work vehicle that travels and works, accompanying the autonomous traveling work vehicle.

BACKGROUND ART

Conventionally, there has been publicly known a technique in which a controller determines whether or not an automatic traveling machine operates erroneously by performing positioning with signals from GPS satellites, and confirming or checking a position of the automatic traveling machine in a specific area, and stops the automatic traveling machine in the case of erroneous operation (e.g., refer to Patent Document 1).

Moreover, there has been publicly known a technique in which in a work form in which straight traveling of traveling along a linear work route and traveling for route change of traveling in a set traveling pattern decided beforehand from a terminal portion of the linear work route toward a next linear work route are repeated by a combine harvester, the automatic route change is enabled so that trouble of the route change is eliminated and an operation burden of a driver is reduced, and further, voice notification means is provided to enable the driver to easily recognize that this route change is being automatically performed (e.g., refer to Patent Document 2).

PRIOR ART DOCUMENTS

Patent Documents

Patent Document 1: JP-A H11-212639 Gazette
Patent Document 2: JP-A 2009-232783 Gazette

SUMMARY OF THE INVENTION

Problem to Be Solved By the Invention

However, in the technique in Patent Document 1, while it is checked whether or not there is malfunction during the automatic traveling, it is not checked whether or there is any abnormality in sensors before the automatic traveling. Accordingly, in the case where an actuator is not used at the time of automatic traveling start, and the actuator is actuated in the middle of work, if the actuation is abnormal, the work needs to be stopped, which deteriorates work efficiency. Especially, if there is any abnormality in a sensor or an actuator concerned with stop, the stop may be disabled even if the stop is attempted after the traveling starts, which can lead to an accident.

Moreover, in the technique of Patent Document 2, the voice notification means notifies whether or not automatic operation is being performed by voice, and the operator operating the combine harvester can only recognize whether or not the operation is automatic. On the other hand, in the case where a manned accompanying traveling work vehicle performs the work while accompanying an unmanned autonomous traveling work vehicle and traveling behind the unmanned autonomous traveling work vehicle, the operator who boards the accompanying traveling work vehicle to perform operation performs the operation while watching the autonomous traveling work vehicle, and thus, the operator may not notice that the autonomous traveling work vehicle is approaching a field end. When this autonomous traveling work vehicle approaches the field end, it rapidly decreases a speed or stops, so that the operator may be bewildered, and sudden stop causes a risk of collision.

The present invention is achieved in light of the above-described situation, and an object of the present invention is to enable an autonomous traveling work vehicle that autonomously travels to be checked on whether or not there is any abnormality before work starts, and equipment having an abnormality to be detected, so that an accident or the like can be prevented. Moreover, another object of the present invention is to enable attention to be attracted so that an accompanying traveling work vehicle does not collide or the like when automatic traveling is started, and the accompanying traveling work vehicle reaches a field end.

Solutions to the Problem

The problems to be solved by the present invention have been described above, and now, means to solve these problems will be described.

According to the present invention, in an autonomous traveling work vehicle including position calculation means for positioning a machine body, utilizing a satellite positioning system, and a control device that causes the autonomous traveling work vehicle to automatically travel and work along a set traveling route, and an accompanying traveling work vehicle that enables the autonomous traveling work vehicle to be operated with a remote operation device mounted on the accompanying traveling work vehicle that performs work while traveling, accompanying the autonomous traveling work vehicle, the accompanying traveling work vehicle is provided with notification means, the notification means can communicate with the autonomous traveling work vehicle through a communication device, and when a distance of the autonomous traveling work vehicle to a field end becomes close to a set distance, a control device makes warning notification with the notification means through the communication device.

According to the present invention, in an autonomous traveling work vehicle including position calculation means for positioning a machine body, utilizing a satellite positioning system, and a control device that causes the autonomous traveling work vehicle to automatically travel and work along a set traveling route, and an accompanying traveling work vehicle that enables the autonomous traveling work vehicle to be operated with a remote operation device mounted on the accompanying traveling work vehicle that performs work while traveling, accompanying the autonomous traveling work vehicle, the accompanying traveling work vehicle is provided with notification means, the notification means can communicate with the autonomous traveling work vehicle through a communication device, and when it becomes before a set time that the autonomous traveling work vehicle reaches a field end, a control device makes warning notification with the notification means through the communication device.

According to the present invention, the notification means displays the notification on a display, and makes the notification by voice from a speaker.

According to the present invention, the control device of the accompanying traveling work vehicle is connected to the communication device, and is also connected to speed change means to decrease a speed when a warning is issued.

According to the present invention, in an autonomous traveling work vehicle including position calculation means for positioning a machine body, utilizing a satellite positioning system, and a control device that causes the autonomous traveling work vehicle to automatically travel and work along a set traveling route, and an accompanying traveling work vehicle that enables the autonomous traveling work vehicle to be operated with a remote operation device mounted on the accompanying traveling work vehicle that performs work while traveling, accompanying the autonomous traveling work vehicle, when automatic traveling start operation is performed, a control device performs check of sensors and actuators before automatic traveling to display whether the sensors and the actuators operate normally or abnormally, and if there is any abnormality, an abnormal portion is displayed to prohibit the automatic traveling.

According to the present invention, if the sensors or the actuators have any abnormality, a warning is issued.

According to the present invention, when the check is performed, operation check is also performed.

Effects of the Invention

By using the above-described means, the operator who operates the autonomous traveling work vehicle can easily recognize that the accompanying traveling work vehicle approaches the field end, and can operate, work and the like at ease.

Moreover, the operator can easily recognize whether or not the autonomous traveling work vehicle has any abnormality before work, and can operate, work, and the like at ease, and an accident can be prevented.

EMBODIMENT OF THE INVENTION

An example will be described in which an autonomous traveling work vehicle 1 that can autonomously travel, utilizing a satellite positioning system is a tractor, and a rotary tilling device 24 is attached to a rear portion of the autonomous traveling work vehicle 1 as a work machine. However, the work vehicle is not limited to the tractor, but may be a combine harvester or the like. Moreover, the work machine is not limited to the rotary tilling device, but may be a furrower, a mower, a rake, a seeding machine, a fertilizer, a wagon or the like.

Figure 1:
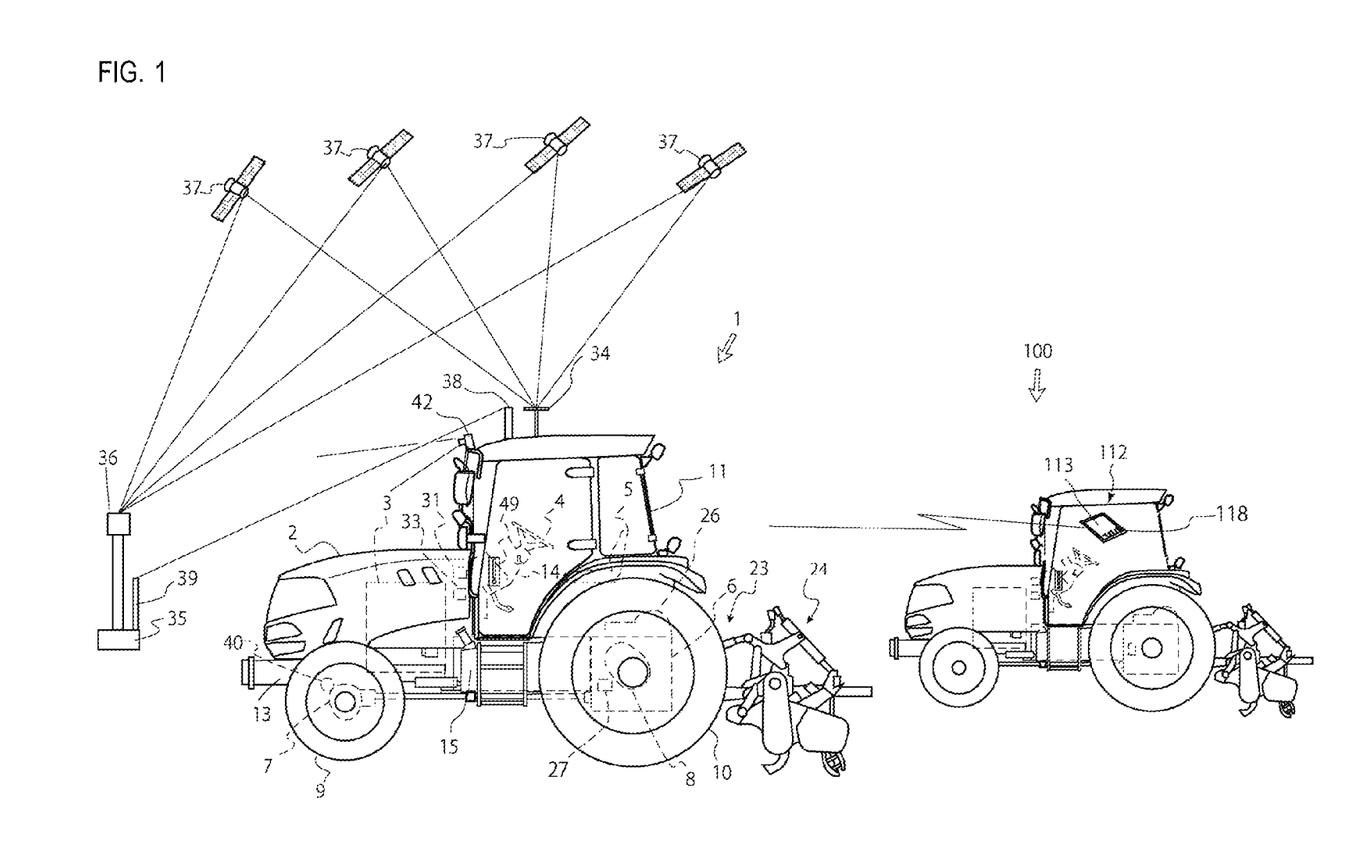
FIG. 1 is a schematic side diagram showing an autonomous traveling work vehicle, GPS satellites, and a reference station.
Figure 2:
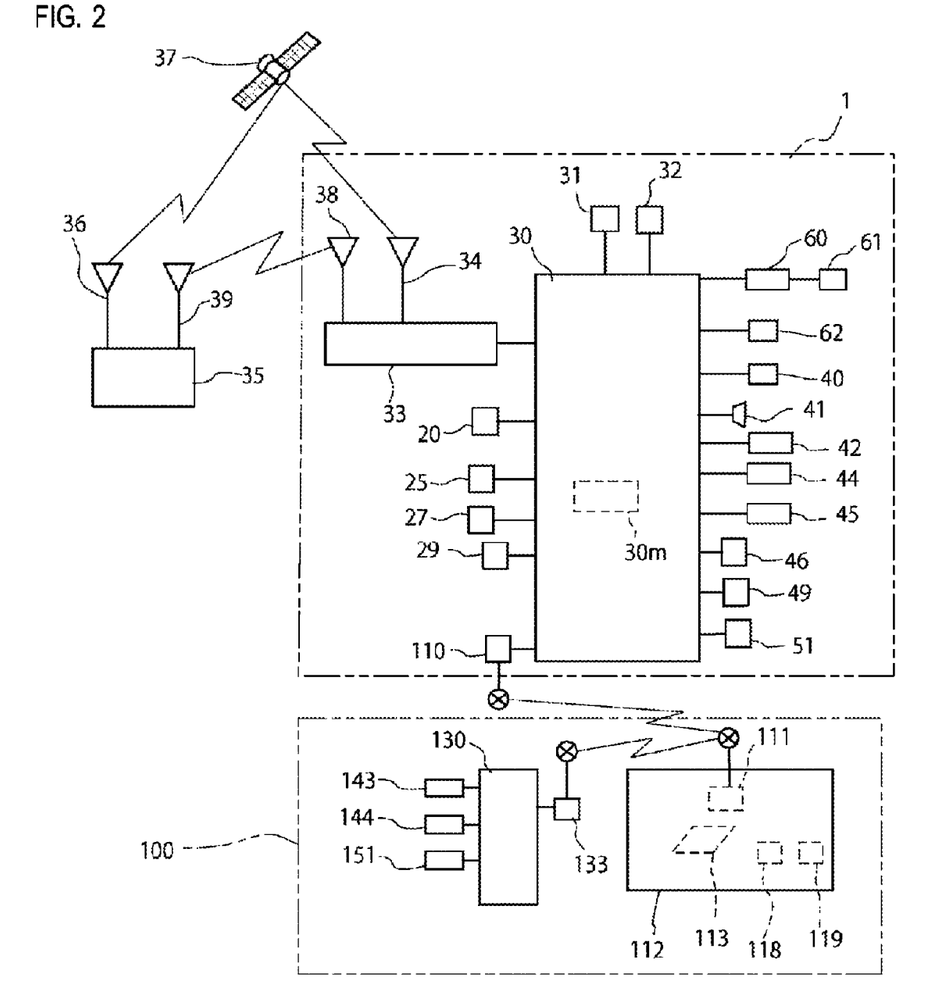
FIG. 2 is a control block diagram.

In FIGS. 1 and 2, a whole configuration of a tractor, which is an autonomous traveling work vehicle 1, will be described. An engine 3 is provided inside a hood 2, a dashboard 14 is provided inside a cabin 11 in the rear of the hood 2, and a steering handle 4, which is steering operation means, is provided on the dashboard 14. Rotation of the steering handle 4 brings about rotation of a direction of front wheels 9, 9 through a steering device. A steering direction of the autonomous traveling work vehicle 1 is sensed by a steering sensor 20. The steering sensor 20 is made of an angle sensor such as a rotary encoder, and is disposed in a rotation base portion of the front wheels 9. However, a sensing configuration of the steering sensor 20 is not limited, but only needs to recognize the steering direction, and may sense the rotation of the steering handle 4, or may sense an operation amount of power steering. A detection value obtained by the steering sensor 20 is inputted to a control device 30.

A driver's seat 5 is provided in the rear of the steering handle 4, and a transmission case 6 is disposed under the driver's seat 5. Rear axle cases 8, 8 are continuously provided on both right and left sides of the transmission case 6, and rear wheels 10, 10 are borne through an axle by the rear axle cases 8, 8. Power from the engine 3 is subjected to speed change by a speed change device (a main speed change device and a sub-speed change device) inside the transmission case 6 to enable the rear wheels 10, 10 to be driven. The speed change device is made of, for example, a hydraulic continuously variable speed change device, and a movable swash plate of a variable displacement type hydraulic pump is actuated by speed change means 44 such as a motor to enable speed change. The speed change means 44 is connected to the control device 30. A rotation speed of the rear wheels 10 is sensed by a vehicle speed sensor 27, and is inputted to the control device 30 as a traveling speed. However, a method of sensing the vehicle speed and a disposition position of the vehicle speed sensor 27 are not limited.

A PTO clutch, a PTO speed change device, and a braking device 46 are contained in the transmission case 6, and the PTO clutch is switched on/off by PTO on/off means 45, and the PTO on/off means 45 is connected to the control device 30 to enable connection/disconnection of power with respect to a PTO shaft to be controlled. The braking device 46 is connected to the control device 30 to enable braking when operation is performed by the operator or during automatic traveling. The control device 30 includes a CPU (Central Processing Unit), a storage device 30m such as a RAM, a ROM and the like, an interface, and the like. Moreover, a program, data, and the like for operating the autonomous traveling work vehicle 1 are stored in the storage device 30m.

A front axle case 7 is supported by a front frame 13 supporting the engine 3, and the front wheels 9, 9 are borne on both sides of the front axle case 7, so that the power from the transmission case 6 can be transmitted to the front wheels 9,9. The front wheels 9, 9 are steering wheels, can be rotated by rotation operation of the steering handle 4, and the front wheels 9, 9 can be rotated by right and left steering by a steering actuator 40 made of a power steering cylinder, which is steering driving means. The steering actuator 40 is connected to the control device 30 to be driven by automatic traveling control.

An engine controller 60, which is engine rotation control means, is connected to the control device 30, and an engine rotation speed sensor 61, a water temperature sensor, a hydraulic sensor and the like are connected to the engine controller 60, so that a state of the engine can be sensed. In the engine controller 60, a load is detected from a set rotation speed and an actual rotation speed, the control is performed to prevent overload, and the state of the engine 3 is transmitted to a remote operation device 112 described later so as to be able to be displayed on a display 113.

Moreover, a level sensor 29 that senses a liquid surface of fuel is disposed in a fuel tank 15 disposed below a step, and is connected to the control device 30. A fuel gauge that displays a residual amount of the fuel is provided in display means 49 provided in the dashboard of the autonomous traveling work vehicle 1, and is connected to the control device 30. Information of the fuel residual amount is transmitted to the remote operation device 112 from the control device 30, so that the fuel residual amount and workable time are displayed on the display 113 of the remote operation device 112.

The display means 49 that displays a rotation speed meter of the engine, the fuel gauge, an oil pressure and the like, a monitor showing abnormality, setting values and so on is disposed on the dashboard 14.

Moreover, the rotary tilling device 24 is configured to perform tilling work as a work machine by being attached in the rear of a tractor body through a work machine attachment device 23 so as to be freely raised and lowered. A raising/lowering cylinder 26 is provided on the transmission case 6, and extending and contracting the raising/lowering cylinder 26 allows a raising/lowering arm making up the work machine attachment device 23 to rotate, so that the rotary tilling device 24 can be raised/lowered. The raising/lowering cylinder 26 is extended and contracted by actuation of a raising/lowering actuator 25, which is connected to the control device 30.

A mobile communicator 33 making up a satellite positioning system is connected to the control device 30. A mobile GPS antenna 34 and a data receiving antenna 38 are connected to the mobile communicator 33, and the mobile GPS antenna 34 and the data receiving antenna 38 are provided above the cabin 11. The mobile communicator 33 includes position calculation means, and transmits latitude and longitude to the control device 30, so that a current position can be grasped. While utilizing a satellite positioning system (GNSS) such as a quasi-zenith satellite (Japan), a GLONASS satellite (Russia) as well as a GPS (USA) enables highly accurate positioning, in the present embodiment, a description will be given, using the GPS.

The autonomous traveling work vehicle 1 includes a gyro sensor 31 to obtain posture change information of the machine body, and an azimuth sensor 32 to sense an advancing direction, which sensors are connected to the control device 30. However, since the advancing direction can be calculated from position measurement by the GPS, the azimuth sensor 32 can be omitted.

The gyro sensor 31 detects an angular velocity of inclination in a front-back direction (pitch) of the machine body of the autonomous traveling work vehicle 1, an angular velocity of inclination in a right-left direction (roll) of the machine body, and an angular velocity of turning (yaw). The three angular velocities are subjected to integral calculation, by which inclination angles in the front-back direction and in the right-left direction, and the turning angle of the machine body of the autonomous traveling work vehicle 1 can be found. As specific examples of the gyro sensor 31, a mechanical type gyro sensor, an optical type gyro sensor, a fluid type gyro sensor, a vibration type gyro sensor and the like are cited. The gyro sensor 31 is connected to the control device 30 to input information of the three angular velocities to the control device 30.

The azimuth sensor 32 detects an orientation (the advancing direction) of the autonomous traveling work vehicle 1. As specific examples of the azimuth sensor 32, a magnetic azimuth sensor and the like are cited. The azimuth sensor 32 is connected to the control device 30 to input information of the orientation of the machine body to the control device 30.

In this manner, the control device 30 arithmetically operates signals acquired from the gyro sensor 31, and the azimuth sensor 32 by posture/azimuth arithmetic operation means to find a posture of the autonomous traveling work vehicle 1 (the orientation, the inclinations in the front-back direction and in the right-left direction, and the turning direction of the machine body).

Next, a method for acquiring position information of the autonomous traveling work vehicle 1, using the GPS (Global Positioning System) will be described.

The GPS is a system originally developed for navigation support of an airplane, a ship and the like, and is made up of 24 GPS satellites that orbit at an altitude of about 20,000 kilometers in the sky (four are disposed in each of six raceway surfaces), a control station to perform tracking and control of the GPS satellites, and a communicator of a user to perform positioning.

As positioning methods using the GPS, various methods such as independent positioning, relative positioning, DGPS (Differential GPS) positioning, RTK-GPS (Real-Time Kinematic-GPS) positioning and the like are cited, and any of these methods can be used. In the present embodiment, the RTK-GPS positioning method, which has a high measurement accuracy, is employed, and this method will be described with reference to FIGS. 1, 2.

The RTK-GPS (Real-Time Kinematic-GPS) positioning is a method in which GPS observation is simultaneously performed at a reference station whose position is known, and at a mobile station whose position is to be found, and data observed at the reference station is transmitted to the mobile station by a method of radio communication or the like in real time to find the position of the mobile station in real time, based on a position result of the reference station.

In the present embodiment, the mobile communicator 33, which is the mobile station, the mobile GPS antenna 34, and the data receiving antenna 38 are disposed in the autonomous traveling work vehicle 1, and a fixed communicator 35, which is the reference station, a fixed GPS antenna 36, and a data transmission antenna 39 are disposed at a predetermined position where they do not disturb work in the field. In the RTK-GPS (Real-Time Kinematic-GPS) positioning in the present embodiment, measurement (relative positioning) of a phase is performed both in the reference station and in the mobile station, and data obtained by positioning in the fixed communicator 35 as the reference station is transmitted from the data transmission antenna 39 to the data receiving antenna 38.

The mobile GPS antenna 34 disposed in the autonomous traveling work vehicle 1 receives signals from GPS satellites 37, 37, . . . . These signals are transmitted to the mobile communicator 33 and positioned. At the same time, the signals from the GPS satellites 37, 37, . . . are received by the fixed GPS antenna 36 as the reference station to be positioned in the fixed communicator 35 and be transmitted to the mobile communicator 33, and observed data is analyzed to decide a position of the mobile station. The position information obtained in this manner is transmitted to the control device 30.

In this manner, the control device 30 in the autonomous traveling work vehicle 1 includes automatic traveling means for automatic traveling, and the automatic traveling means receives radio waves transmitted from the GPS satellites 37, 37, . . . to find position information of the machine body at set time intervals in the mobile communicator 33 and to find displacement information and azimuth information of the machine body from the gyro sensor 31 and the azimuth sensor 32. Based on the position information, the displacement information, and the azimuth information, the steering actuator 40, the speed change means 44, the raising/lowering actuator 25, the PTO on/off means 45, the engine controller 60 and the like are controlled so that the machine body travels along a set route R set in advance, by which the autonomous traveling work vehicle 1 can automatically travel and automatically work. Position information of an outer periphery of the field H, which is a work range, is also set in advance by a well-known method, and is stored in the storage device 30*m*.

Moreover, an obstacle sensor 41 and a camera 42 are disposed as obstacle sensing means in the autonomous traveling work vehicle 1, and are connected to the control device 30 to prevent the autonomous traveling work vehicle 1 from abutting on an obstacle. For example, the obstacle sensor 41 is made of an infrared sensor or an ultrasonic wave sensor, and is disposed in a front portion, a side portion, or a rear portion of the machine body. Further, the obstacle sensor 41 is connected to the control device 30 to detect whether or not an obstacle exists in front of, beside, or in the rear of the machine body, and controls to issue a warning and decrease the traveling speed or stop the autonomous traveling work vehicle 1 if any obstacle is detected.

Moreover, the camera 42 that photographs a front side and the work machine is mounted on the autonomous traveling work vehicle 1, and is connected to the control device 30. A video photographed by the camera 42 is displayed on the display 113 of the remote operation device 112 included in the accompanying traveling work vehicle 100.

The remote operation device 112 sets the set traveling route R of the autonomous traveling work vehicle 1, remotely operates the autonomous traveling work vehicle 1, monitors a traveling state of the autonomous traveling work vehicle 1 and an actuation state of the work machine, and stores work data.

Figure 3:
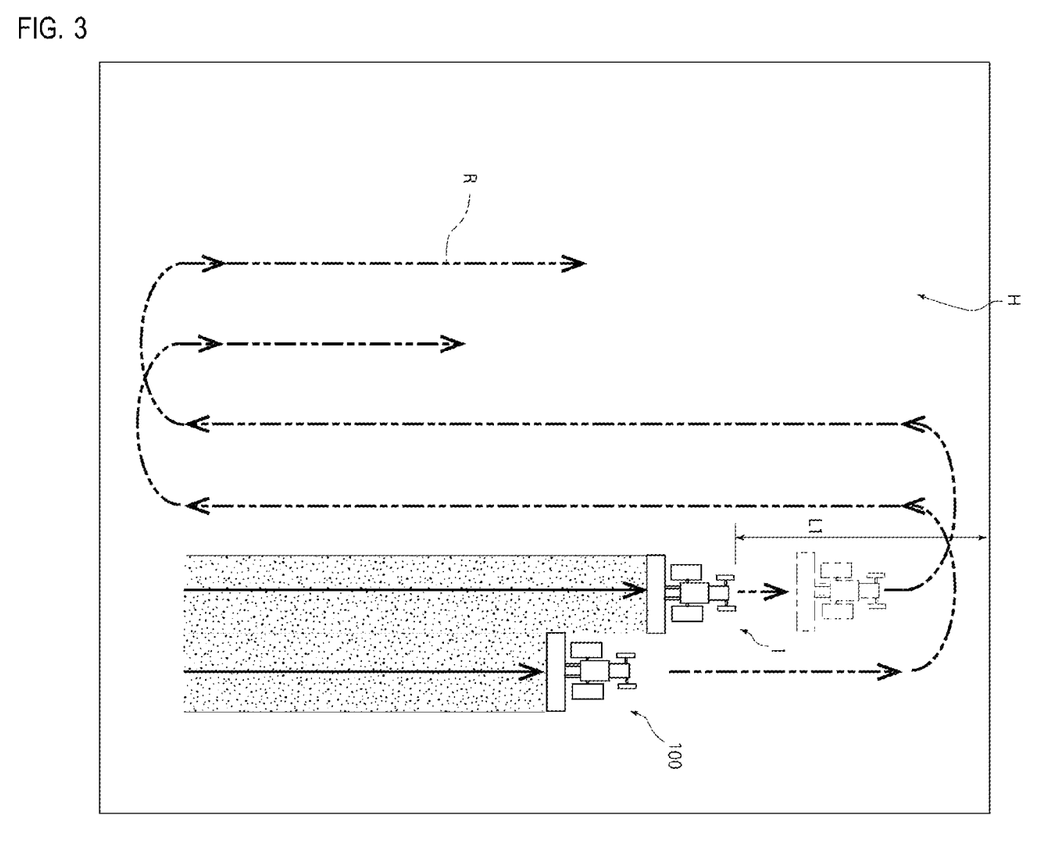
FIG. 3 is a diagram showing a state of work by the autonomous traveling work vehicle and an accompanying traveling work vehicle.

In the present embodiment, the operator boards the accompanying traveling work vehicle 100 to operate and drive the accompanying traveling work vehicle 100, and the remote operation device 112 is mounted on the accompanying traveling work vehicle 100 to enable the autonomous traveling work vehicle 1 to be operated. As shown in FIG. 3, the accompanying traveling work vehicle 100 travels diagonally behind the autonomous traveling work vehicle 1 while working, and monitors/operates the autonomous traveling work vehicle 1. However, it is not limited, because in some work forms, the accompanying traveling work vehicle 100 may travel behind the autonomous traveling work vehicle 1 to perform work. A basic configuration of the accompanying traveling work vehicle 100 is substantially the same as that of the autonomous traveling work vehicle 1, and thus, detailed description is omitted. A configuration can also be employed in which the accompanying traveling work vehicle 100 includes the mobile communicator 33 and the mobile GPS antenna 34 for the GPS.

The remote operation device 112 can be attached and detached with respect to operation portions such as dashboards of the accompanying traveling work vehicle 100 and the autonomous traveling work vehicle 1. The remote operation device 112 can be operated in a state being attached to the dashboard of the accompanying traveling work vehicle 100, can be operated in a state where it is taken out of the accompanying traveling work vehicle 100 and is carried, or can be operated in a state being attached to the dashboard of the autonomous traveling work vehicle 1. The remote operation device 112 can be made of, for example, a notebook type or tablet type personal computer. In the present embodiment, the remote operation device 112 is made of a tablet type computer.

Furthermore, the remote operation device 112 and the autonomous traveling work vehicle 1 are configured communicably to each other by radio, and the autonomous traveling work vehicle 1 and the remote operation device 112 are provided with transceivers 110, 111 for communication, respectively. The transceiver 111 is configured integrally with the remote operation device 112. Communication means is configured mutually communicably, for example, by a radio LAN such as WiFi. The remote operation device 112 is provided with the display 113 on a housing surface, which display is a touch panel type operation screen that can be operated by touching the screen, and the transceiver 111, a CPU, a storage device, a battery and the like are contained in a housing.

The autonomous traveling work vehicle 1 can be remotely operated by the remote operation device 112. For example, emergency stop, temporary stop, restarting, change of vehicle speed, change of engine rotation speed, raising/lowering of the work machine, on/off of the PTO clutch and the like of the autonomous traveling work vehicle 1 can be operated. That is, an axel actuator, the speed change means 44, the braking device 46, the PTO on/off means 45 and the like are controlled from the remote operation device 112 through the transceiver 111, the transceiver 110, and the control device 30, so that the worker can remotely operate the autonomous traveling work vehicle 1 with ease.

On the display 113, the image of the surroundings photographed by the camera 42, the state of the autonomous traveling work vehicle 1, the state of the work, the information regarding the GPS, the operation screen and the like can be displayed, so that the operator can monitor them.

As the state of the autonomous traveling work vehicle 1, a traveling state, a state of the engine, a state of the work machine and the like are cited, and as the traveling state, a speed change position, a vehicle speed, a fuel residual amount, a voltage of a battery and the like are cited. As the state of the engine, a rotation speed, a load factor and the like of the engine are cited, and as the state of the work machine, a type of the work machine, a PTO rotation speed, a work machine height and the like are cited. They are displayed in numerical forms, in level meters or the like on the display 113.

As the state of the work, a work route (a target route or the set traveling route R), a work process, a current position, a distance to a headland calculated from the process, a remaining route, a number of processes, a past work time, a remaining work time and the like are cited. The remaining route can be easily recognized by painting out a route after the work from the whole work route. Moreover, the next process including a turning direction and the like from the current can be easily recognized by indicating the next process by arrow from the current position.

The information regarding the GPS is latitude and longitude, which are an actual position of the autonomous traveling work vehicle 1, a capturing number and radio wave reception intensity of each of the satellites, abnormality of the positioning system and the like.

Next, control will be described with reference to FIGS. 1 to 3, in which in the case where the autonomous traveling work vehicle 1 travels and works along the set traveling route R, when the autonomous traveling work vehicle 1 approaches the field end at a set distance, warning notification is made by notification means provided in the accompanying traveling work vehicle 100.

In the accompanying traveling work vehicle 100, the display 113 included in the remote operation device 112 is provided as the notification means, and the warning is displayed on the display 113. A speaker 151 is provided in the accompanying traveling work vehicle 100, and the speaker 151 is connected to a control device 130, which is connected to a communication device 133, so that the control device 130 and the control device 30 can communicate with each other. However, the speaker 151 can be provided integrally with the remote operation device 112.

Moreover, speed change means 144 is connected to the control device 130 so as to enable the traveling speed to be changed and controlled. The speed change means 144 changes an angle of a swash plate of an HST or switches a hydraulic clutch to change the speed, but is not limited to this. Traveling stop means 143 is connected to the control device 130 to enable traveling stop control. The traveling stop means 143 neutralizes a braking actuator or a continuously variable speed change device, but is not limited to this.

When the autonomous traveling work vehicle 1 is traveling and working along the set traveling route R, and a distance L from the field end becomes a set distance L1 or less, the warning notification is made from the speaker 151, and at the same time, the display 113 indicates that the autonomous traveling work vehicle 1 is located before the set distance L. This distance L from the field end can be easily arithmetically operated from position information of a field H and position information of the autonomous traveling work vehicle 1 from the GPS. However, timing of the warning notification is not limited to the position before the set distance L, but the warning notification may be made before a set time that the autonomous traveling work vehicle 1 reaches the field end. This time till the autonomous traveling work vehicle 1 reaches the field end can be easily arithmetically operated from the distance L and the traveling speed of the autonomous traveling work vehicle 1. Moreover, prenotification is not made only one time, but a plurality of set distances may be provided to make the warning notification in stages. The set distance L or the set time before the field end can be arbitrarily changed by setting means. Moreover, in place of the distance to the field end, the control can also be set so that the warning notification is made at a set distance or a set time before the autonomous traveling work vehicle 1 starts the turning.

As the specific warning notification, "the vehicle will soon reach a field end", "the vehicle will soon perform headland turning" or the like is displayed on the display 113, and is informed by voice from the speaker 151. In this manner, the operator is allowed to recognize that the autonomous traveling work vehicle 1 is approaching the field end.

At the same time as the warning notification, the speed change means 144 of the accompanying traveling work vehicle 100 can also be controlled to decrease the speed to a predetermined low speed stage. In this case, if the traveling speed of the accompanying traveling work vehicle 100 has already been decreased to the set speed, this speed decreasing control is not performed. In this manner, a risk that the accompanying traveling work vehicle 100 catches up with the autonomous traveling work vehicle 1 and collides with the same when the autonomous traveling work vehicle 1 approaches the field end and decreases the speed can be avoided.

Moreover, when the autonomous traveling work vehicle 1 is being turning, control can also be performed so as to actuate the traveling stop means 143 of the accompanying traveling work vehicle 100 and to stop the accompanying traveling work vehicle 100. In this case, if the accompanying traveling work vehicle 100 has stopped, this stop control is not performed. In this manner, when the autonomous traveling work vehicle 1 is turning, the accompanying traveling work vehicle 100 is prevented from being too close.

Figure 4:
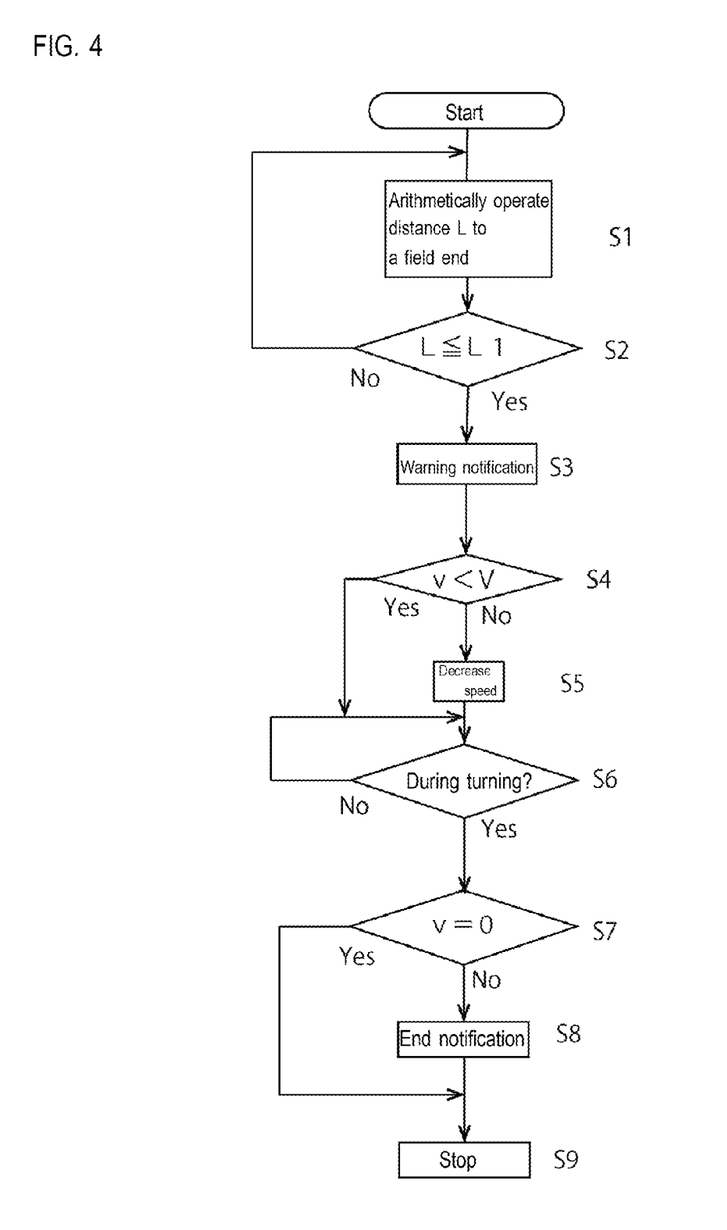
FIG. 4 is a diagram showing a control flowchart of warning notification of an approach to field end.

Specific control will be described with reference to FIGS. 3, 4.

When the autonomous traveling work vehicle 1 travels along the set traveling route R, the control device 30 arithmetically operates the distance L1 to the field end (S1), and determines whether or not the distance L1 to the field end has reached the set distance L (S2). If the distance L1 to the field end has reached the set distance L, it is notified that the autonomous traveling work vehicle 1 is approaching the field end by voice from the speaker 151 by the control device 130 through the communication device (S3). At this time, the control device 130 of the accompanying traveling work vehicle 100 determines whether or not a traveling speed v has been decreased to a set low speed V or lower (S4), and if the speed has not been decreased, the speed is decreased by the speed change means 144 (S5), while if the speed has been decreased, the processing shifts to step S6.

When the autonomous traveling work vehicle 1 further advances, and enters turning operation (S6), the control device 30 transmits, to the control device 130, the information that the autonomous traveling work vehicle 1 is turning, and the control device 130 of the accompanying traveling work vehicle 100 determines whether or not the traveling speed V is in a stop state (S7). If it does not stop, the traveling stop means 143 is actuated to stop the accompanying traveling work vehicle 100 (S8). In the case where the control is performed, based on the time till the field end is reached as well, the accompanying traveling work vehicle 100 is similarly controlled.

In this manner, in the autonomous traveling work vehicle 1 including position calculation means for positioning a machine body, utilizing the satellite positioning system, and the control device 30 that causes the autonomous traveling work vehicle 1 to automatically travel and work along the set traveling route, and the accompanying traveling work vehicle that enables the autonomous traveling work vehicle 1 to be operated with the remote operation device 112 mounted on the accompanying traveling work vehicle 100 that performs work while traveling, accompanying the autonomous traveling work vehicle 1, the accompanying traveling work vehicle 100 is provided with the display 113 and the speaker 151 as the notification means, the notification means can communicate with the autonomous traveling work vehicle 1 through the communication device 133, and when the distance L1 to the field end of the autonomous traveling work vehicle 1 becomes close to the set distance L, or the set time before the autonomous traveling work vehicle 1 reaches the field end, the control device 30 transmits the information thereof to the control device 130 of the accompanying traveling work vehicle 100 through the communication device to make the warning notification with the notification means. Thus, the operator can recognize that the autonomous traveling work vehicle 1 will reach the field end, so that he or she can work at ease without rapid stop.

Moreover, since as to the notification means, the warning is displayed on the display 113, and the warning is notified by voice from the speaker 151, the operator can recognize it with eyes and ears, and can prevent a mistake.

Moreover, the control device 130 of the accompanying traveling work vehicle 100 is connected to the communication device 133, and is also connected to the speed change means 144, and when the warning is issued, the speed is decreased. Thus, as compared with a case where the operator operates after having recognized the field end, operation delay is avoided, so that the speed is surely decreased and a risk of collision is eliminated.

Figure 5:
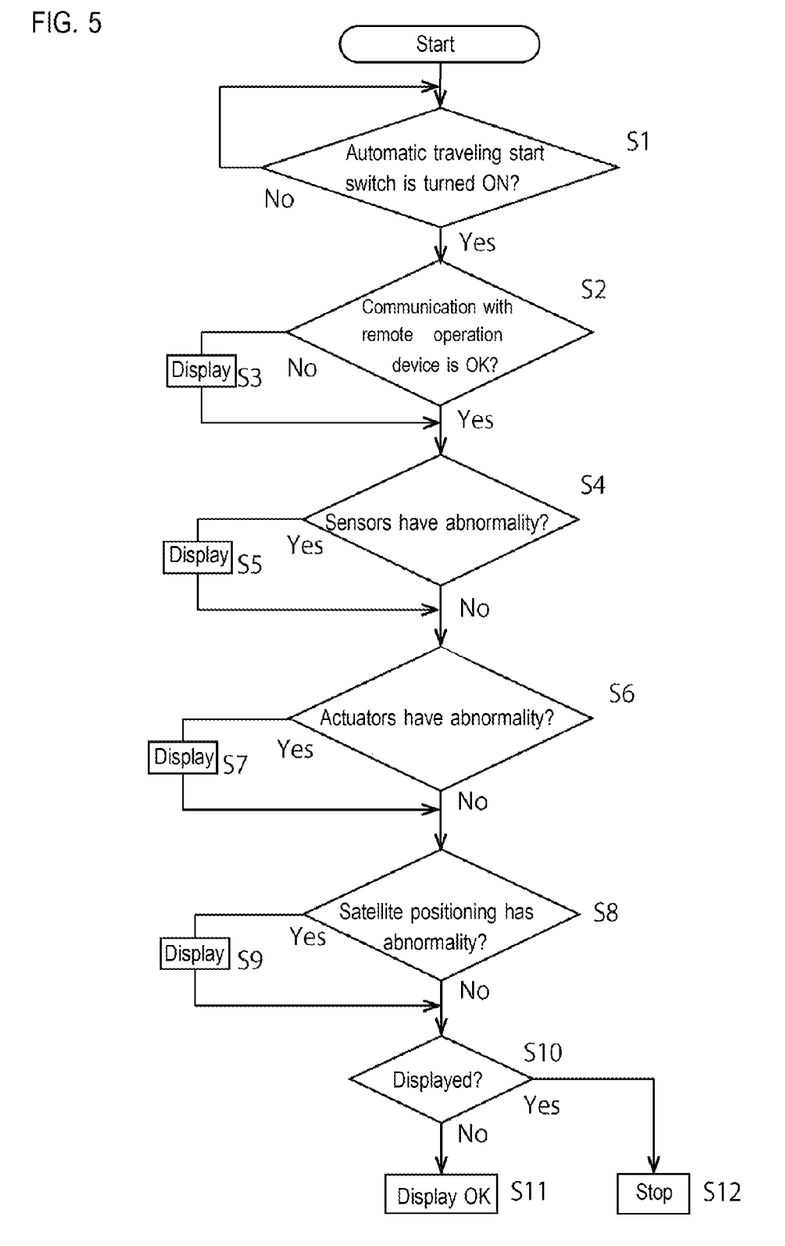
FIG. 5 is a diagram showing a control flowchart of abnormality warning.

Next, control to check whether or not automatic traveling by the autonomous traveling work vehicle 1 is enabled will be described with reference to FIG. 5.

Whether or not sensors, actuators and the like have any abnormality is checked before the autonomous traveling work vehicle 1 automatically travels. This abnormality check is performed with the remote operation device 112. However, a configuration can also be employed in which the abnormality check is performed in the display means 49 or the like provided on the dashboard 14 of the autonomous traveling work vehicle 1. The abnormality check is performed by operating an automatic traveling start switch 119 included in the remote operation device 112. However, the abnormality check can also be automatically performed when a key switch 62 is operated to start the engine 3, or before a check switch 118 provided in the remote operation device 112 or in the vicinity of the driver's seat is operated to start the automatic traveling.

First, when the automatic traveling start switch 119 is pressed (S1), it is checked whether or not the communication is enabled between the remote operation device 112 and the control device 30 of the autonomous traveling work vehicle 1 (S2). If the communication is abnormal, this information is displayed on the display 113 (S3), and repairing is promoted because setting operation, operation, or the like of the autonomous traveling work vehicle 1 with the remote operation device 112 is disabled, and processing shifts to step S4. If the communication is normal, the processing shifts to step 4.

In step S4, the sensors are checked (S4). It is checked whether in each of the sensors, a predetermined output voltage is outputted (an abnormal voltage is not outputted), a short circuit or disconnection is caused or not, and so on. If there is any abnormality, a sensor name and an abnormality content are displayed on the display 113 (S5), and the processing shifts to step S6. As the sensors are cited, for example, the steering sensor 20, the vehicle speed sensor 27, the level sensor 29, the gyro sensor 31, the azimuth sensor 32, an obstacle sensor 41, the camera 42, a position sensor that detects a speed change position of a main speed change lever, a speed change position of a sub-speed change lever, and a speed change position of a PTO speed change lever, a position sensor that detects a raising/lowering height of the rotary tilling device 24, a voltage sensing sensor of the battery and the like. As for a rotation sensor, a water temperature sensor, a hydraulic sensor and the like provided in the engine 3, if there is any abnormality, the abnormality is sensed and displayed as an abnormality of the engine through an engine controller 60. If there is no abnormality in the sensors, the processing also shifts to step S6.

In step S6, it is checked whether or not the actuators have abnormality (S6). In the check of the actuators, whether or not each of the actuators is short-circuited, disconnected, a current of a set value or more flows and so on are checked. If there is any abnormality, an actuator name and an abnormality content are displayed on the display 113 (S7), and the processing shifts to step S8. As the actuators, the raising/lowering actuator 25, the steering actuator 40, the speed change means 44, an actuator of the braking device 46 and the like are cited. If the actuators have no abnormality, the processing also shifts to step S8.

In step S8, it is checked whether or not the satellite positioning system normally operates (S8). If the satellite positioning is disabled, this information is displayed (S9), and the processing shifts to step 10. If the satellite positioning system normally operates, the processing also shifts to step S10.

In step S10, if no abnormality is displayed, it is indicated that there is no abnormality (S11), and if there are any abnormality, all the abnormalities are displayed to prohibit the automatic traveling and stop it (S12). At this time, the warning may be issued by the speaker 151, a lamp or the like, and normal operation may also be indicated by voice, music, an indication lamp or the like.

In this manner, before the automatic traveling is performed, it can be checked whether or not there is any abnormality, erroneous operation due to a sensor defect or an actuator defect can be prevented. Especially, if the braking device 46, the speed change means 44, the obstacle sensor 41, the vehicle speed sensor 27, the engine controller 60 or the like, which are concerned with stop, outputs an abnormal value, or if the actuators are not actuated, there is a risk of runaway, which becomes a cause of an accident, so that the abnormality check before work is important. Moreover, when the engine 3 is started, or when the automatic traveling start switch 119 is operated, the abnormality check is automatically performed. This enables the operation and the confirmation work of the operator to be omitted, and can prevent the check operation from being forgotten.

After the abnormality check of the sensors and the actuators is performed, operation check on whether or not the autonomous traveling work vehicle 1 actually operates can also be performed. Particularly, a trial run is executed in which the autonomous traveling work vehicle 1 is caused to travel a short distance (e.g., several ten centimeters), and is braked to stop, and self-check on whether or not the braking device 46, the speed change means 44, the engine 3 or the like has any abnormality is performed. In this operation check, the actuators to be operated are displayed on the display 113, and the actuators are sequentially actuated one by one to perform operation confirmation as to whether or not the actuators normally operate. While this confirmation is performed, using the sensors, the operator may visually confirm this. If any of the actuators does not operate normally, the relevant actuator is displayed on the display 113. At this time, the warning may be issued. In this manner, it is not until the autonomous traveling work vehicle 1 is actually operated that the abnormality can be found. For this operation confirmation, selection is enabled from automatic execution by selection means, execution by manually selecting one by one, or execution by selecting and checking arbitrary operation, and the like.

INDUSTRIAL APPLICABILITY

The present invention is applicable to a control device of a construction machine, a work vehicle for agriculture, or the like wherein two work vehicles perform accompanying traveling and work inside a predetermined work region such as a field and the like.

DESCRIPTION OF REFERENCE SIGNS

1: Autonomous traveling work vehicle
30: Control device
100: Accompanying traveling work vehicle
112: Remote operation device
113: Display
118: Check switch
130: Control device
144: Speed change means
151: Speaker

The invention claimed is:

1. A traveling system of work vehicles wherein
in an autonomous traveling work vehicle including position calculation means for positioning a machine body, utilizing a satellite positioning system, and a control device that causes the autonomous traveling work vehicle to automatically travel and work along a set traveling route, and an accompanying traveling work vehicle that enables the autonomous traveling work vehicle to be operated with a remote operation device mounted on the accompanying traveling work vehicle that performs work while traveling, accompanying the autonomous traveling work vehicle,
the accompanying traveling work vehicle is provided with notification means, the notification means can communicate with the autonomous traveling work vehicle through a communication device, and when a distance of the autonomous traveling work vehicle to a field end becomes close to a set distance, a control device makes warning notification with the notification means through the communication device.

2. A traveling system of work vehicles wherein
in an autonomous traveling work vehicle including position calculation means for positioning a machine body, utilizing a satellite positioning system, and a control device that causes the autonomous traveling work vehicle to automatically travel and work along a set traveling route, and an accompanying traveling work vehicle that enables the autonomous traveling work vehicle to be operated with a remote operation device mounted on the accompanying traveling work vehicle that performs work while traveling, accompanying the autonomous traveling work vehicle,
the accompanying traveling work vehicle is provided with notification means, the notification means can communicate with the autonomous traveling work vehicle through a communication device, and when it becomes before a set time that the autonomous traveling work vehicle reaches a field end, a control device makes warning notification with the notification means through the communication device.

3. The traveling system of work vehicles according to claim 1, wherein the notification means displays the notification on a display, and makes the notification by voice from a speaker.

4. The traveling system of work vehicles according to claim 1, wherein the control device of the accompanying traveling work vehicle is connected to the communication device, and is also connected to speed change means to decrease a speed when a warning is issued.

5. A traveling system of work vehicles, wherein
in an autonomous traveling work vehicle including position calculation means for positioning a machine body, utilizing a satellite positioning system, and a control device that causes the autonomous traveling work vehicle to automatically travel and work along a set traveling route, and an accompanying traveling work vehicle that enables the autonomous traveling work vehicle to be operated with a remote operation device mounted on the accompanying traveling work vehicle that performs work while traveling, accompanying the autonomous traveling work vehicle,
when automatic traveling start operation is performed, a control device performs check of sensors and actuators before automatic traveling to display whether the sensors and the actuators operate normally or abnormally, and if there is any abnormality, an abnormal portion is displayed to prohibit the automatic traveling.

6. The traveling system of work vehicles according to claim 5, wherein if the sensors or the actuators have any abnormality, a warning is issued.

7. The traveling system of work vehicles according to claim 5, wherein when the check is performed, operation check is also performed.

8. The traveling system of work vehicles according to claim 2, wherein the notification means displays the notification on a display, and makes the notification by voice from a speaker.

9. The traveling system of work vehicles according to claim 2, wherein the control device of the accompanying traveling work vehicle is connected to the communication device, and is also connected to speed change means to decrease a speed when a warning is issued.

* * * * *